United States Patent

Arapis

[11] Patent Number: 5,524,694
[45] Date of Patent: Jun. 11, 1996

[54] PROTECTIVE SCREEN FOR VEHICLE WINDOW

[75] Inventor: Christopher Arapis, Jamaica, N.Y.

[73] Assignee: H. G. Maybeck Co., Inc., Jamaica, N.Y.

[21] Appl. No.: 308,546

[22] Filed: Sep. 21, 1994

[51] Int. Cl.⁶ .................................................. B60J 1/20
[52] U.S. Cl. .................. 160/370.21; 160/368.1; 160/354; 296/152
[58] Field of Search ............... 160/368.1, 370.21, 160/370.22, 370.23, 354, 84.02, 84.04, 371, 368.2; 296/97.7, 97.8, 138, 97.9, 152

[56] References Cited

U.S. PATENT DOCUMENTS

| | | |
|---|---|---|
| 1,798,524 | 3/1931 | Di Palma . |
| 1,982,455 | 11/1934 | Sansbury . |
| 2,098,174 | 11/1937 | Giberson . |
| 2,595,833 | 5/1952 | Flaherty . |
| 2,992,850 | 7/1961 | Schatzman . |
| 3,085,621 | 4/1963 | Meranto ................ 160/370.21 X |
| 3,749,147 | 7/1973 | Hess et al. . |
| 4,352,316 | 10/1982 | Medlin . |
| 4,779,918 | 10/1988 | McNamee . |
| 4,964,667 | 10/1990 | Reis . |
| 5,002,326 | 3/1991 | Westfield et al. ........... 160/370.21 X |
| 5,121,957 | 6/1992 | O'Shea . |
| 5,290,086 | 3/1994 | Tucker ......................... 296/152 |

*Primary Examiner*—Blair M. Johnson
*Attorney, Agent, or Firm*—Stephen E. Feldman

[57] ABSTRACT

An open mesh fabric material defined by hexagonal openings is fashioned into a see-through, protective hood or cover which is fit over the upper or window portion of the door of a motor vehicle, and protects the occupants of the vehicle from rocks, bricks, block and other debris thrown at a motor vehicle. Straps, coupled to the cover, loop around the bottom of the door for securing the cover over the window opening in the door. The straps are preferably elastic so that when fitted under the door the straps hold the cover in place over the window and exert a pulling force on the cover to pull the open mesh material taut over the window opening. Alternatively, buckles or strap length adjusting hardware may be used to shorten the effective length of the straps. A clear, transparent plastic sheet is connected to the cover, positioned inside the hood so as to be situated between the inner surface of the window and the inside sheet of the cover. The plastic sheet is in relaxed or non-taut condition when the material of the cover is pulled taut over the window opening of the vehicle.

11 Claims, 3 Drawing Sheets

PROTECTIVE SCREEN FOR VEHICLE WINDOW

BACKGROUND OF THE INVENTION

1. Field of the Invention

The present invention relates to protective screens for protecting persons in a motor vehicle. More particularly, the present invention provides a protective screen which fits over the window of a motor vehicle and protects the driver and/or passengers in the motor vehicle from flying objects, such as rocks, bricks, blocks and/or other debris thrown at the vehicle and further protects persons from the glass that may be broken by such flying objects causing slivers of glass and pieces of glass to spew into the vehicle. The invention further provides a see-through screen that is flexible, readily portable and easily fitted into place on a vehicle and easily moved from vehicle to vehicle.

2. Prior Art

In the past few years attacks by people against police vehicles and military vehicles and the personnel in such vehicles have become more prevalent. Often attacks against such vehicle are made without warning as the vehicle is driven down the road way and the attacks are broken off by the attackers before the occupants of the vehicle can stop the vehicle and engage the attackers. In coping with this problem, it appears prudent for the police and/or military personnel to retreat from such attacks, especially when an attack occurs in a densely populated area. Such attacks often involve the throwing of rocks, bricks, blocks and/or other objects at a passing vehicle, resulting in hitting the window glass on the vehicle and breaking the window, the thrown, flying objects and flying glass causing injury to the occupants of the vehicle.

Protective devices for this kind of attack have not been anticipated and those protective devices for motor vehicles that appear to be available are expensive, require much time for fitting and mounting the device on vehicle. Available protective devices are difficult to remove and change from vehicle to vehicle, and are generally inflexible.

U.S. Pat. No. 4,352,316, issued to Medlin teaches a lightweight armored vehicle and a method of making a vehicle bulletproof but it is believed that the structure and methods taught by Medlin are excessive where thrown objects such as rocks, bricks and/or blocks are used against a motor vehicle.

Other U.S. patents, such as:

| U.S. Pat. No. | 1,982,455 | issued to Sansbury | 1934 |
| U.S. Pat. No. | 2,098,174 | issued to Giberson | 1937 |
| U.S. Pat. No. | 2,595,833 | issued to Flaherty | 1952 | each teach screen apparatus that addresses the problem of flying insects entering open windows of vehicles. These vehicle screens are relatively weak, special purpose screens and, it is believed are not up-gradeable so as to use such screen to protect vehicle passengers from heavy objects thrown at a vehicle, nor protect occupants of a vehicle from broken and splinted glass.

The U.S. Pat. No. 2,992,850 issued to Schatzman in 1961 teaches an interior mounted screening or grille that prevents access to the interior of a vehicle through a window opening where the window is open or has been smashed. The Schatzman teaching is a theft prevention device. U.S. Pat. No. 5,121,957 issued to O'Shea in 1992 teaches a protection sheet that addresses the problem of protection from broken glass and other debris after an accident has occurred. The O'Shea teaching is directed toward containment of glass broken during the rescue of victims of a vehicle accident.

SUMMARY OF THE PRESENT INVENTION

The present invention provides a see-through, protective screen which covers both the exterior and the interior of the window of a motor vehicle, the protective screen protecting persons within the motor vehicle from flying debris and/or other objects thrown or directed at the window of the vehicle and from flying glass broken by such flying debris and objects.

The present novel protective screen is fabricated from a flexible, open mesh fabric of woven thread or cord, knotted together along regular intervals or segments of woven fabric, forming hexagonal shaped openings in the fabric. The open mesh fabric is flexible and has great strength. Each segment of woven material is substantially the same length and may be in the range of ½ of an inch to ¾ of an inch in length.

The open mesh fabric is woven from a heavy, threadlike cord of filament or twisted plastic and/or cotton cord, such as nylon or polyester or a combination thereof, for example. The woven fabric has great strength, with preferably minimal stretch, when held taut. In its preferred form, the open mesh fabric of the protective screen is fabricated into a cover or hood which fits over the door of a motor vehicle, covering both sides of the door and the window portion of the door. If desired, the hood may be contoured to fit over the window portion of a door of a vehicle. The contour of the hood may be defined by a webbing material, along the top of the hood and by a hem of webbing material sewn to the open mesh fabric around the open part of the hood.

Securing straps are connected to the hood, such as by sewing the end of the strap to the hem of the hood, for example. The straps, which are secured to the opening of the open mesh fabric hood provide a means for drawing the flexible, open mesh fabric taut over the inner and outer surfaces of the door covered by the hood. Preferably the securing straps are adjustable in length. The securing straps may be an elastic material and may loop under, or couple together under the door covered by the hood, extending between opposite hems on the cover or hood. The securing straps may be non-stretch and may include a tightening means, such as a buckle or other length-adjusting hardware which effectively shortens the strap, as desired. For example, two inch wide webbing material has been used successfully for securing straps.

The open mesh fabric protective hood when fitted over the door of a vehicle and covering the window opening in the door and pulled tightly over the door so as to cover each side of the window in the door with substantially taut surfaces, has substantial stopping power for stopping flying objects such as rocks, bricks, blocks and other debris thrown at vehicle from entering the window opening. However, there may be some latitude of movement toward and away from the window in the open mesh fabric and/or the open mesh fabric may not be so tight or taut as to prevent a thrown object from making contact with and breaking the window covered by the protective hood.

In accordance with the invention, a sheet of transparent plastic material, such as vinyl, for example, is provided on the inside of the hood, connected to the top of the hood and extending to and connected to the hemmed edge of the hood so as to cover the interior side of the window covered by the hood. The transparent plastic sheet is essentially larger in surface than the surface of the fabric to which it is connected so that when the open mesh fabric of the hood is pulled taut over the door of the vehicle the transparent plastic sheet remains slack or relaxed inside the hood. The open mesh fabric of the hood which is over or covers the inside of the door is on the outside of the transparent plastic sheet and serves as a back-up or support for the plastic sheet. A plastic sheet in relaxed or slack condition, when backed-up by a taut support has more stopping power for or against broken glass than a taut plastic sheet.

The open mesh fabric of the hood and the transparent plastic sheet inside the hood, the preferred plastic sheet being a clear, transparent plastic, such as vinyl, for example, provides a see-through hood or cover that protects persons inside the vehicle from flying objects thrown at the vehicle and striking the window area and from glass broken by such flying objects. The cover or hood is easily and quickly fitted into place over the door and easily removed therefrom, it is a transient device that may be quickly and easily move from one vehicle to another. When the open mesh fabric material is woven from a plastic cord or thread, the open mesh fabric material is rot-proof.

DETAILED DESCRIPTION OF THE INVENTION

Figure 1:
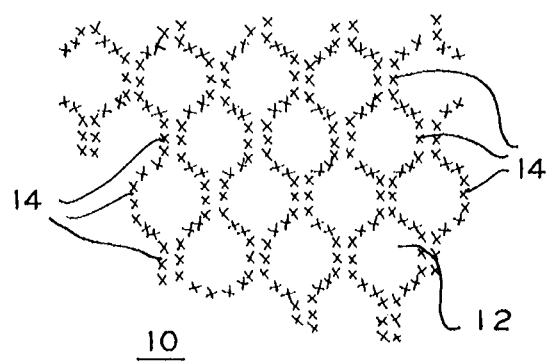
FIG. 1 is a representation of a section of the preferred embodiment of open mesh fabric used in the invention.
Figure 2:
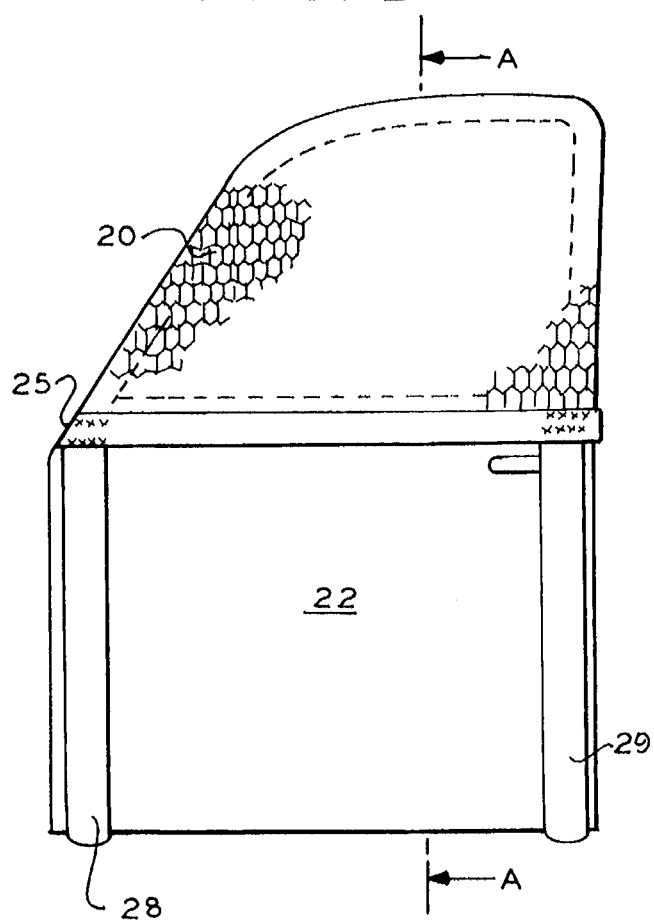
FIG. 2 is a representation of the invention in use on a door of a motor vehicle.
Figure 2A:
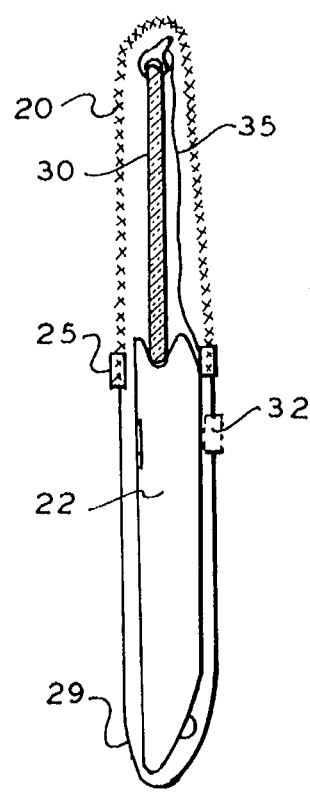
FIG. 2a is a cross-section view along line A—A in FIG. 2.

FIG. 1 represents a section of the open mesh fabric material 10 preferred in practicing the invention. The material is an open mesh fabric, in hexagon shape 12 knotted or woven together at regular intervals so that the vertical lines 14 of the mesh are doubled. The cord or thread from which the mesh is woven is preferably a plastic, such as nylon or polyester, although cotton or other thread or cord may be used, if desired. The mesh is preferably woven so as to have a minimum stretch in the fabric. The fabric may be woven or knotted into a hood, cover or sleeve shape 20 so that the hood fits over and covers the top of the door 22 of a vehicle, and extends below the window opening 21 in the door, as represented in FIG. 2. FIG. 2a shows in a cross-section view along line A—A of FIG. 2 that the mesh fits over the door 22.

Along the opening of the hood or cover is a hem webbing 25, which is sewn to the mesh fabric. Straps 28 and 29, which may be a webbing material, are connected to the hem webbing, 25, by sewing, for example. The straps may be elastic, and may be shortened, so that the mesh cover is pulled tight over the door, covering the window opening 21 and/or the window 30. The strap may be of non-stretch webbing and may include a tightening or shortening means 32 such as a buckle, for example, (represented in broken line form) so that the straps 28/29 may be effectively shortened to tighten the mesh cover or hood over the door and the window opening in the door.

On the interior of the mesh cover is a transparent sheet of plastic, transparent material 35, which is connected to the top of the cover and to the hem webbing 25. When the mesh cover is fitted over a door of a vehicle, the transparent sheet of material will be positioned between the window or window opening in the door and the inside section of the mesh cover. The transparent sheet 35 is preferable a clear, transparent plastic material such as vinyl, for example. The transparent sheet is secured to the mesh cover, at least along the upper and lower edges of the transparent sheet. The size of the sheet 35 is such that the sheet covers the interior surface of the glass window but is preferably retained in position in relaxed condition while the mesh material of the cover over the door of the vehicle is pulled taut.

The mesh cover or hood is tightly drawn over the door of the vehicle and covers the exterior side and the interior side of the window in the door. The hexagonal shaped openings in the mesh fabric are preferably of substantially uniform size and shape, being in the range of from ½ inch to ¾ inch in size. It has been found that an open mesh fabric having these characteristics provides good visibility through the mesh fabric.

The strap webbing are connected to the hem webbing, the latter being connected, as by sewing, for example, to the mesh fabric around the opening of the cover. The strap webbing are adjustable so that the material of the mesh cover can be made taut over the vehicle door and over the window opening in the door so as to be a substantial barrier to and repel flying objects thrown at the window of the vehicle.

The open mesh fabric has great strength and has minimum stretch so that the mesh fabric will repel many flying objects. However, in the event that the energy of the flying debris striking the window area of the vehicle exceeds that which may be repelled by the external portion of the protective mesh screen, the window glass in the window opening may be hit and damaged by the flying object. In the event that the window glass is hit and is damaged, the transparent plastic sheet 35 is provided to repel or contain any glass that may be broken and projected toward the interior of the vehicle. The transparent plastic sheet is kept in relaxed or non-taut condition so that the plastic sheet may yield to the moving or flying glass and prevent penetration, by the glass of the plastic sheet. In the preferred embodiment of the invention, the plastic sheet is backed-up by the interior portion of the protective mesh screen.

Figure 4:
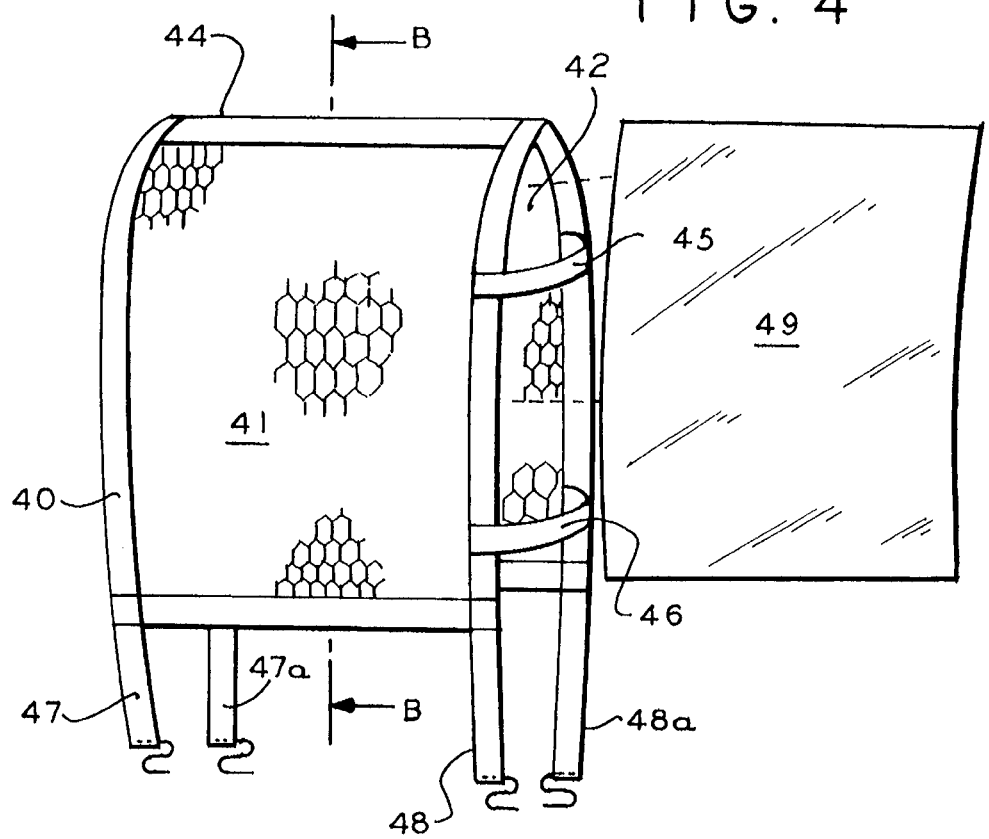
FIG. 4 is a representation of an alternative structure of the invention.
Figure 4A:
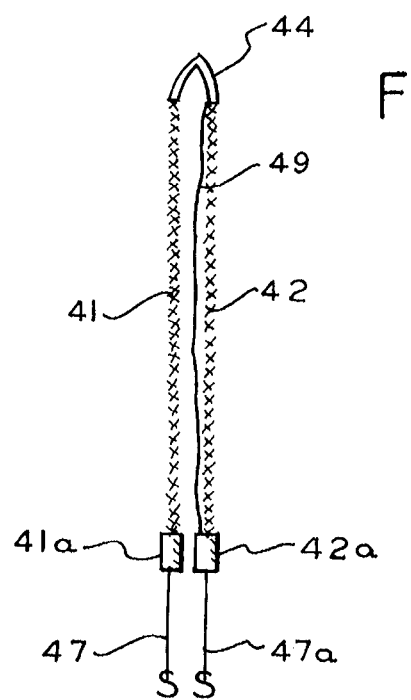
FIG. 4a is a cross-section view along line B—B in FIG. 4.

FIG. 4 represents an alternate embodiment of the invention. As represented in FIG. 2 and 2a, the preferred embodiment of the invention provides a cover, hood or sock which is closed at the sides and top. The alternate embodiment of the invention represented in FIG. 4 provides a modified hood or cover 40, which has open sides as well as the open entry of the hood or cover, the top portion of the cover being closed. The sheets 41 and 42 of open mesh fabric, are closed at the top of the cover, secured together by a web binding 44, sewn together, for example, in a conventional manner. The sides of the sheets 41 and 42 are hemmed and are open, with retaining straps 45 and 46, on one side of the cover, connected to each of the sheets to limit the size of sheet separation. The bottom of each sheet is finished with a web hem 41a and 42a.

The pairs of straps 47/47a and 48/48a are connected to the hem of the sheets 41 and 42, respectively and each strap includes a hook or snap at the end thereof for connecting to each other or for connecting to the bottom of the door over which the modified hood may be fitted. The snap or hook at the ends of the straps are represented as "S" hooks. The straps 47/47a and 48/48a may be elastic and, when hooked together under a door or hooked on to the bottom of a door for securing the modified hood over the door of a vehicle, the straps may exert a pulling force on the modified hood or cover so that both sheets 41 and 42 may be tight or taut over the window opening of the door over which the modified hood is fitted.

A clear, transparent plastic sheet 49 is connected to the modified hood at the binding 44 and the hem webbing 42a so that the plastic sheet 49 forms a companion sheet with the interior open mesh sheet 42.

Figure 3:
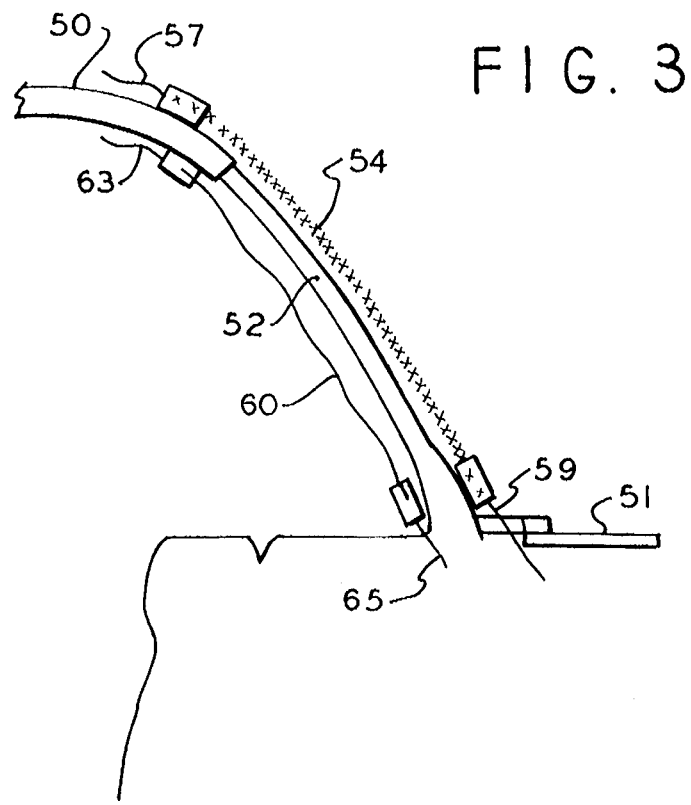
FIG. 3 is a representation of another form of the invention used on a back window of a motor vehicle.
Figure 3A:
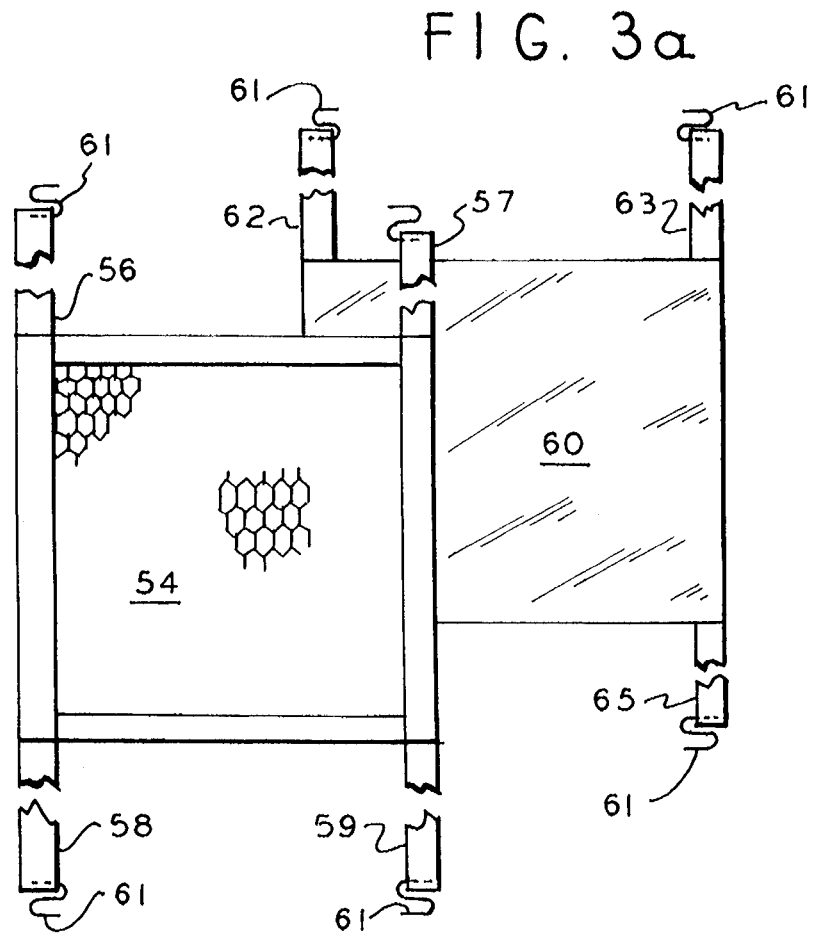
FIG. 3a is a representation of the invention represented in FIG. 3.

FIG. 3 represents another alternate embodiment of the open mesh fabric protective screen, represented in place over a fixed window on a motor vehicle. FIG. 3a is a representation of the protective screen used for a fixed window on a motor vehicle. It will be appreciated that the fixed window represented in FIG. 3 represents the rear window of an automobile. However, the fixed window also represents other fixed windows on motor vehicles, such as the fixed window on a van, for example, or any other fixed window on a vehicle.

Part of a vehicle roof 50 and a trunk hood 51 are shown, with the rear window 52 between the roof and trunk hood. An open mesh fabric sheet 54 is secured over the outside of the window 52 by the upper securing straps 56 and 57 and the lower securing straps 58 and 59. The securing straps are represented as having hooks 61 that may secure the protective sheet to the vehicle, over the window. The straps connected to the open mesh fabric sheet 54 may include adjustable means, (not shown) such a buckle, for example, used to shorten the length of the respective strap and pull the open mesh fabric sheet 54 taut over the window 52.

The protective cover is a clear, transparent plastic sheet 60, such as vinyl, for example, with securing straps 62 and 63 connected to the top of the plastic sheet and straps 64 and 65 (only strap 65 shown) connected to the bottom of the plastic sheet. The clear transparent plastic sheet 60 is secured over the inside of the window 52 and serves to contain glass of the rear window, for example, that may be broken and/or shattered.

Thus there has be described and shown a preferred embodiment of the present invention, for providing a protective cover or screen over the window in the door of a vehicle, for protecting occupants of the vehicle. Several alternate embodiments of the invention have also been shown and described. Changes and modification to the invention may be made as will become apparent to those skilled in the art, without departing from the invention defined in the claims.

What is claimed is:

1. A protective cover for covering a window and a window opening in a motor vehicle and for protecting the occupants of said motor vehicle from objects thrown so as to enter said motor vehicle through said window opening and from glass broken from said window by said objects, said protective cover comprising:

an open mesh fabric material defining a hood for covering said window opening in said motor vehicle and for covering said window in said window opening, said hood for covering an outer surface and an inner surface of said window opening and said window;

a transparent flexible plastic sheet means coupled to said hood and positioned for covering said inner surface of said window and said window opening, said transparent sheet means secured inside said hood for retaining glass broken from said window; and strap means having a first end and a second end, said first end connected to said hood, said second end connectable to said motor vehicle for securing said hood over said window opening and for exerting a pulling force on said hood for pulling said open mesh fabric material taut over said window opening and said window in said window opening.

2. A protective cover as in claim 1 and further including a door in said motor vehicle, said door for supporting said window opening and said window in said window opening and said hood covers a portion of said door and said window opening and said window.

3. A protective cover as in claim 1 and wherein said transparent plastic sheet is in a non-taut condition when said open mesh fabric material is in a taut condition over said window opening.

4. A protective see-through screen for covering a window in a motor vehicle for protecting occupants of said motor vehicle from objects thrown at said motor vehicle by persons outside said motor vehicle, said protective see-through screen comprising:

a sheet of open mesh fabric material woven from a threadlike cord having segments of woven material knotted together defining hexagonal openings of substantially uniform size, said sheet of open mesh fabric material for covering an outer side of said window of said motor vehicle;

strap means connected to said open mesh fabric material for retaining said sheet over said outer side of said window, said strap means including coupling means for coupling said strap means to said motor vehicle, said strap means further including means for exerting a pulling force between said coupling means and said open mesh fabric material for pulling said sheet taut over said outer side of said window; and flexible sheet means for covering said window opening of said motor vehicle, said means being transparent.

5. A protective screen for covering a window opening and a window in said window opening in a door of a motor vehicle for protecting occupants of said motor vehicle from objects thrown at said motor vehicle and about to pass through said window opening, and from glass broken from said window, said protective screen comprising:

an open mesh fabric material having an inner sheet and an outer sheet, said inner sheet and said outer sheet defining a cover for covering a first portion of said door of said motor vehicle for covering said window opening in said door on an inner side thereof and an outer side thereof;

strap means connected to said inner sheet and to said outer sheet and defining a loop of said strap means for extending around a second portion of said door, said strap means including means for exerting a force on said open mesh fabric material for pulling said cover taut over said window opening; and a flexible transparent sheet means connected to said open mesh fabric material and positioned between said inner sheet and said outer sheet and covering said window opening in said door.

6. A protective screen as in claim 5 and in which said open mesh fabric material has openings substantially uniform in size and substantially uniform in shape and said shape is hexagonal.

7. A protective screen as in claim 6 and in which said hexagonal shape openings are formed by incremental sections of said open mesh fabric which in a range of ½ inch in length to ¾ inch in length.

8. A protective screen as in claim 5 and in which said transparent sheet means is in a relaxed, non-taut condition when said cover is pulled taut over said window area.

9. A protective screen as in claim 5 and in which said means for exerting a force on said open mesh fabric material is elastic.

10. A protective screen as in claim 5 and in which said strap means includes means for shortening the length of said strap means for exerting a pulling force on said open mesh fabric material for pulling said cover taut.

11. A protective see-through screen for covering a window in a motor vehicle for protecting occupants of said motor vehicle from objects thrown at said motor vehicle by persons outside said motor vehicle, said protective see-through screen comprising:

a sheet of open mesh fabric material woven from a threadlike cord having segments of woven material knotted together defining hexagonal openings of substantially uniform size, said sheet of open mesh fabric material for covering an outer side of said window of said motor vehicle;

strap means connected to said open mesh fabric material for retaining said sheet over said outer side of side of said window, said strap means including coupling means for coupling said strap means to said motor vehicle, said strap means further including means for exerting a pulling force between said coupling means and said open mesh fabric material for pulling said sheet taut over said outer side of said window; and flexible plastic sheet means for covering an inner side of said window of said motor vehicle, said plastic sheet means being a transparent, clear vinyl.

* * * * *